Inventor:
SIEGFRIED KOFINK

United States Patent Office 3,181,562
Patented May 4, 1965

3,181,562
LUBRICATING FLUID DISTRIBUTOR SYSTEM
Siegfried Kofink, Zell (Neckar), Germany, assignor to Geratebau Eberspacher, Esslingen (Neckar), Germany, a German firm
Filed May 17, 1963, Ser. No. 281,124
Claims priority, application Germany, July 18, 1962, G 35,492
5 Claims. (Cl. 137—561)

This invention relates in general to fluid distributing devices and, in particular, to a new and useful lubricating oil distributor for bearings, particularly for machines such as gas turbines, wherein a return lubricating oil line is provided.

The purpose of a parallel arrangement of a lubricating oil return line with a supply line to the bearing points is, particularly with hydrodynamic sliding bearings, to lower the oil pressure. In such cases, in contrast to hydrostatic sliding bearings, a wedge-shaped lubricating layer is formed which absorbs the bearing force which is drawn by itself. The oil is supplied without pressure or by very little pressure and is drawn into the wedge if the speed of the revolving parts is sufficient to form the required oil pressure for a bearing capacity.

A certain oil pressure may not be exceeded in order to maintain the hydrodynamic oil pressure. The hydrodynamic oil pressure will collapse when the axial speed approaches the circumferential speed. In circulation lubricating systems it is difficult to maintain a certain pressure range and flow rate if the delivering devices which bring about the circulation are driven by the machine which requires the lubrication. When the machine runs with varying revolutions per minute, different delivered speed and pressures occur in the lubricating oil system supply with resultant varying oil quantities being delivered. This, as already mentioned, is harmful in sliding bearings with hydrodynamic lubrication. In pure hydrostatic sliding bearings it is also preferable to equalize the pressure, and the gaps between the parts are dimensioned for certain load and pressure conditions.

For hydrostatic sliding bearings with forced circulation lubrication, it has been proposed to regulate the oil quantity and pressure by throttling. For this purpose, the division of the lubricating oil pressure into a branch stream for servicing various bearing points and one into a stream for return to the oil drain has been provided. By such measures, however, a pressure equalization is not usually attainable. In the throttled bore and in the return bore the different pressures at different fluctuations in the lubricating oil system will always be equal to the total pressure.

In accordance with the present invention, there is provided a simple distributing device which includes a cylindrical member arranged in a large sized bore which connects at one end to a line for supplying a bearing requiring lubrication and which is supplied with lubricant directed tangentially into a side area thereof. The construction also includes a return exiting tangentially from the wide diameter bore at a spaced location from the inlet. A distributor is inserted in the large diameter bore and includes a widened peripheral portion which is tightly engaged in the bore, such as by threading. The large diameter bore portions of the distributor are separated by intermediate annular portions of lesser diameter providing annular flow passages, one in alignment with the incoming flow of lubrication under pressure from the supply conduit, and another in alignment with the discharge conduit for return to the sump. A feature of the construction is that the orifice member is provided with openings to the interior at each reduced diameter annular portion so that lubricating oil may flow from the inlet line into the center of the distributor where it is tangentially whirled. A portion of the flow into the interior of the distributor is delivered under substantially constant pressure to the outlet at an end thereof to the bearings requiring lubrication. Some small portion is also able to escape through a similar opening at the opposite end of the distributor which aligns with the discharge passage for the purpose of recirculating the lubrication back to the sump. The distributor acts to maintain the pressure in the circulating lubricating system as constant as possible since the amount of lubricating liquid which will be recirculated through the orifices communicating with the return line will be proportional to the pressure of the lubrication at the supply line.

By arranging the distributor so that the oil is directed inwardly into the center thereof and rotated, the physical occurrences at the center of rotation will insure that the quantities of lubricating oil flowing through the central oil supply source of the bearings will remain almost the same at all supply pressures and engine speeds.

A further advantage in the distributor construction of the present invention is that by rotating the oil within the separator there is a centrifugal separating effect with the heavier suspended particles being hurled outwardly and directed into the discharge bore to the return system. Thus, the lubricating oil passing to the bearing points under constant pressure is also purified.

Accordingly, it is an object of this invention to provide an improved distributor for supplying lubricant to a metal part requiring lubrication.

A further object of the invention is to provide a distributor system for delivering lubricating oil to a bearing at substantially constant flow rate which includes a throttling element arranged in the oil stream to direct a portion of the lubricating oil to a bearing point and a portion backwardly to the return line.

A further object of the invention is to provide a distributor device for supplying lubricating oil from a supply line where it is delivered at variable pressures to a bearing feed line at substantially constant flow rate comprising a cylindrical member arranged in a widened bore having an end connected to the bearing feed line, and a side tangentially connected by the lubricating supply line, with means in the bore for whirling the oil and delivering a constant pressure supply to said bearing feed line, and returning a portion to a return line.

A further object of the invention is to provide a distributor device for lubricating oil systems and the like, which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 1:
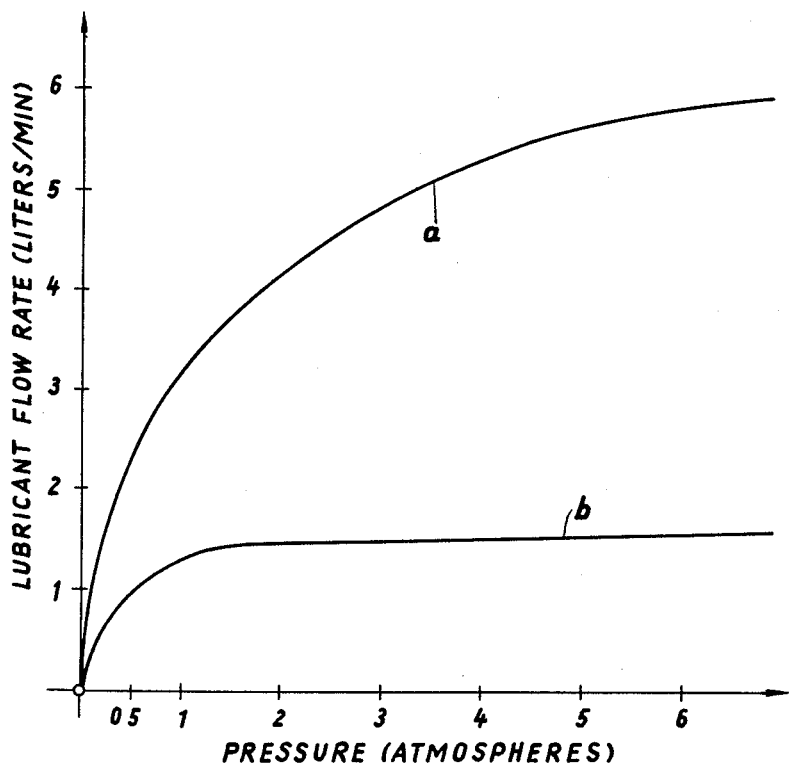
FIG. 1 is a graph indicating the characteristics produced by a distributor constructed in accordance with the invention.

Referring to the drawings in particular, the invention embodied therein is explainable through the graph in FIG. 1, which indicates on an ordinate axis the quantities of oil per unit of time flowing in the pressure lubricating oil line as a function of the pressure which is indicated on the abscissa axis. The total flow which increases with increasing pressure through the main lubricating oil line in an ordinary turbine operating device which includes a turbine driven lubricating oil pump, is shown by the curve $a$. In accordance with the invention, the curve $b$ is produced, showing that the distributor provides for a constant lubricant flow rate after the pressure has been increased to an initial constant amount.

Figure 2:
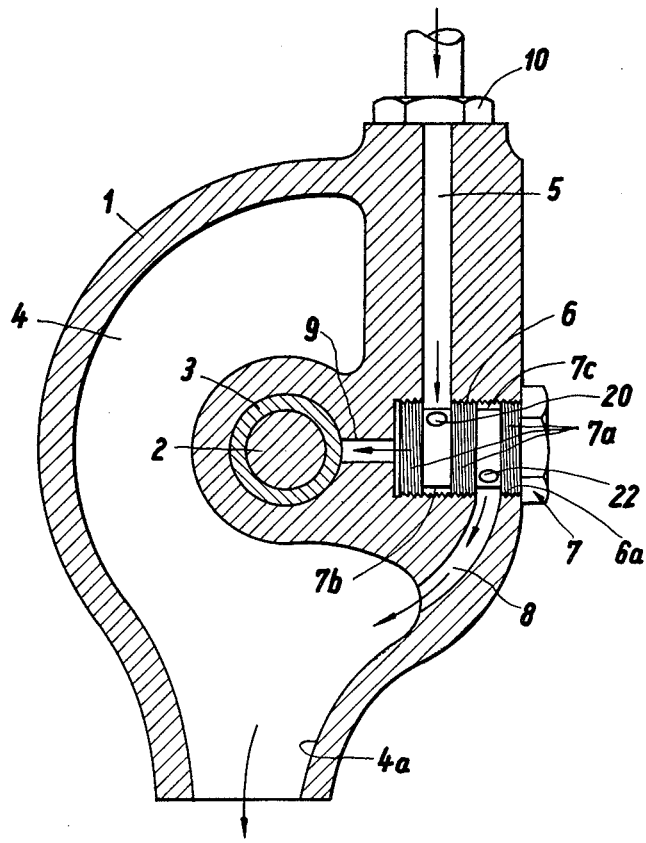
FIG. 2 is a partial transverse section of a bearing housing of an exhaust gas turbocharger having a lubricating oil distributor system according to the invention.

In FIG. 2 there is indicated a bearing housing 1 of an exhaust gas turbocharger which has a shaft 2 supported in a radial sliding bearing 3. The housing 1 defines an oil collecting zone 4 therewith which includes a drain 4a at the bottom thereof. Lubricating oil is supplied through the conduit 5 which opens into a large diameter bore 6a having an axis at right angles thereto. Bore 6a is partially internally threaded, in order to receive a hollow distributor member of the device 7, constructed in accordance with the invention.

Figure 4:
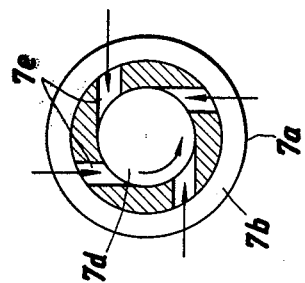
FIG. 4 is a section taken on the line 4—4 of FIG. 3.
Figure 3:
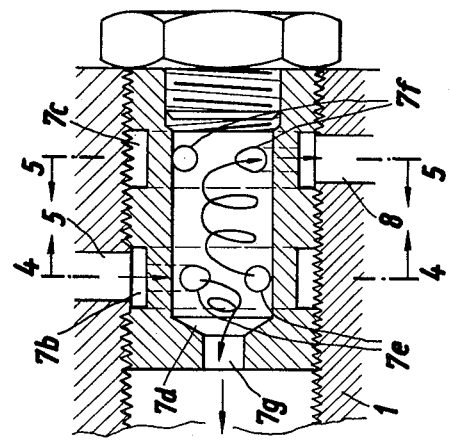
FIG. 3 is an enlarged axial section through a lubricating oil distributor according to the invention.
Figure 5:
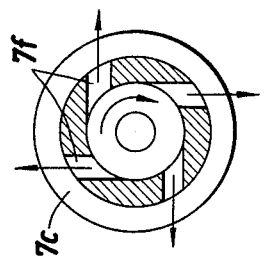
FIG. 5 is a section taken on the line 5—5 of FIG. 3.

The distributor device 7 is threaded at axially spaced widened diameter exterior portions and is threadably engaged in the threaded portion of the bore 6a. The distributor 7 includes two annular cutouts or smaller diameter areas 7b and 7c formed at axially spaced locations. The one area 7b is aligned with the supply conduit 5 and oil or other lubricants which flow inwardly from the supply conduit may flow around the annular space between the distributor 7 and the wall of the bore 6a, and through one or more openings 20, where it is whirled tangentially within the interior of the distributor 7. Some of the oil will flow in accordance with the pressure of the delivery in the supply conduit 5 out through openings 22 defined in the smaller diameter portion 7c for discharge outwardly through the return line 8. As indicated in the sectional views of FIGS. 4 and 5, the openings 20 lead to tangential passages 7f, and the openings 22 to the tangential passages 7e. The distributor, as indicated in FIG. 3, also includes an outlet passage 7g defined at the lower end for permitting flow of the lubricating oil to the passage 9 which supplies the bearing 3.

Thus, the oil which is circulated through the conduit 5 at varying pressures will pass through the openings 20 and the tangential bores 7e and be whirled around in the interior of the distributor 7. In accordance with the pressure and quantity supply, a portion of this oil will be delivered outwardly through the openings 22 and tangential passages 7f into the return line 8. The openings 20 and 22 are sized so that a constant flow of oil at constant pressure will be discharged through the end 7g and into the supply conduit 9.

While specific embodiments of the invention have been shown and described in detail to illustrate the application of the inventive principles, it will be understood that the invention may be embodied otherwise without departing from such principles.

What is claimed is:

1. A lubricating fluid distributor system comprising a supply line for supplying lubricating fluid at various pressures and quantities, a distributor device defining a distributing bore arranged substantially transverse to the supply line, the supply line being connected tangentially into said distributing bore, said distributor device bore having an opening at one end defining a passage for the flow of lubricating fluid to a bearing part, a return line connected tangentially into the bore of said distributor device, the bore of said distributor device together with the tangential connection of said supply line and said return line defining means for rotating the fluid delivered from said supply line and for delivering a portion of the fluid through the opening at one end for delivery to a bearing part at substantially constant flow rate and for delivering an additional portion to said return line.

2. A lubricating fluid distributor system according to claim 1, wherein said distributor device is a plug member having a widened diameter portion with two axially spaced cutout portions defined in the periphery thereof, wall means surrounding said distributor device at the location of said cutout portions forming annular flow areas at said cutout portions, one of said cutout portions being connected with the supply conduit and the other of said cutout portions being connected with the return conduit.

3. A lubricating system comprising a first conduit for supplying lubricating oil, wall means defining a relatively large diameter bore connected tangentially by said first conduit, said large diameter bore having an opening at each end, a second conduit for feeding lubricating fluid to a bearing connected into the opening of one end of said large diameter bore, and a hollow plug member having a plug bore opening at one end connected to said second conduit and being threaded into the opening of the opposite end of said large diameter bore and including a first area of reduced diameter defining with said wall means a first annular flow passage, a supply conduit connected into said first annular flow passage, said plug member having a tangential inlet extending inwardly into the interior of said plug member from said annular flow passage, said plug member having a hollow curved interior wall for the whirling of fluid therein which is supplied from said supply conduit, a second area of reduced diameter defining with said wall means a second annular flow passage, a return line connected to said bore at the location of the second annular flow passage, said plug including at least one opening extending from said second annular flow passage into the interior of said plug member for receiving oil from the interior of said plug member and for returning the same to said return line.

4. A lubricating system according to claim 3, wherein said plug includes a plurality of inlet openings at the location of the first area of reduced diameter extending tangentially into the interior of said plug member for whirling the lubricating oil against the interior wall thereof.

5. A lubricating system according to claim 3, wherein said plug includes a plurality of openings extending from said second annular flow passage into the interior of said plug member for tangentially receiving lubricating oil which is delivered into the interior of said plug member through said first conduit.

References Cited by the Examiner

UNITED STATES PATENTS

| | | | |
|---|---|---|---|
| 2,840,240 | 6/58 | Snyder | 210—512 |
| 2,984,410 | 5/61 | Giacosa | 184—6 XR |
| 3,034,647 | 5/62 | Giesse | 210—512 XR |

M. CARY NELSON, *Primary Examiner.*